United States Patent
Harvey

[15] 3,693,526
[45] Sept. 26, 1972

[54] COMPACT FOLDING CAMERA

[72] Inventor: Donald M. Harvey, Webster, N.Y.

[73] Assignee: Eastman Kodak Company, Rochester, N.Y.

[22] Filed: Feb. 1, 1971

[21] Appl. No.: 111,469

[52] U.S. Cl. .................................................. 95/39
[51] Int. Cl. ............................................. G03b 17/04
[58] Field of Search ...................... 95/32, 33, 39, 40

[56] References Cited

UNITED STATES PATENTS

| | | | |
|---|---|---|---|
| 2,880,659 | 4/1959 | Land | 95/39 X |
| 785,239 | 3/1905 | Thornton | 95/33 |
| 2,047,257 | 7/1936 | Crumrine | 95/40 X |

Primary Examiner—Samuel S. Matthews
Assistant Examiner—Monroe H. Hayes
Attorney—W. H. J. Kline and Addison Mathews

[57] ABSTRACT

A self-processing photographic camera includes a boxlike housing provided with a lens support door that is hinged to the housing at one end and which supports the camera lens at its opposite end. A collapsible bellows provides a light seal between the door and the housing and permits the door to move between an open position in oblique relation to the casing and a closed position at which the lens end of the door is adjacent the front wall of the casing but extends somewhat forwardly thereof. A novel supplemental door cooperates with the lens support door to releasably retain the latter in its closed position and to protect the camera lens from dirt or accidental damage.

2 Claims, 6 Drawing Figures

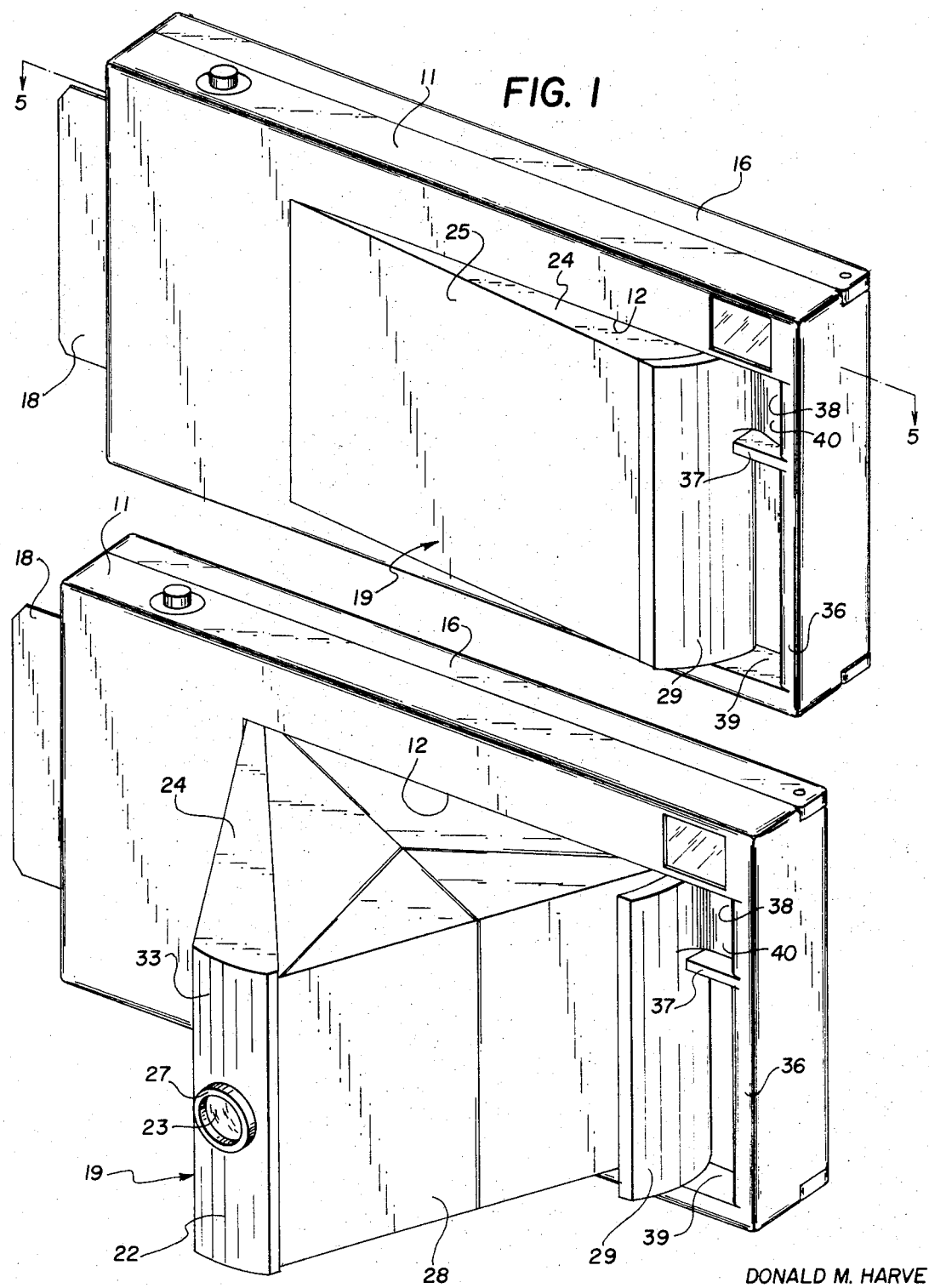

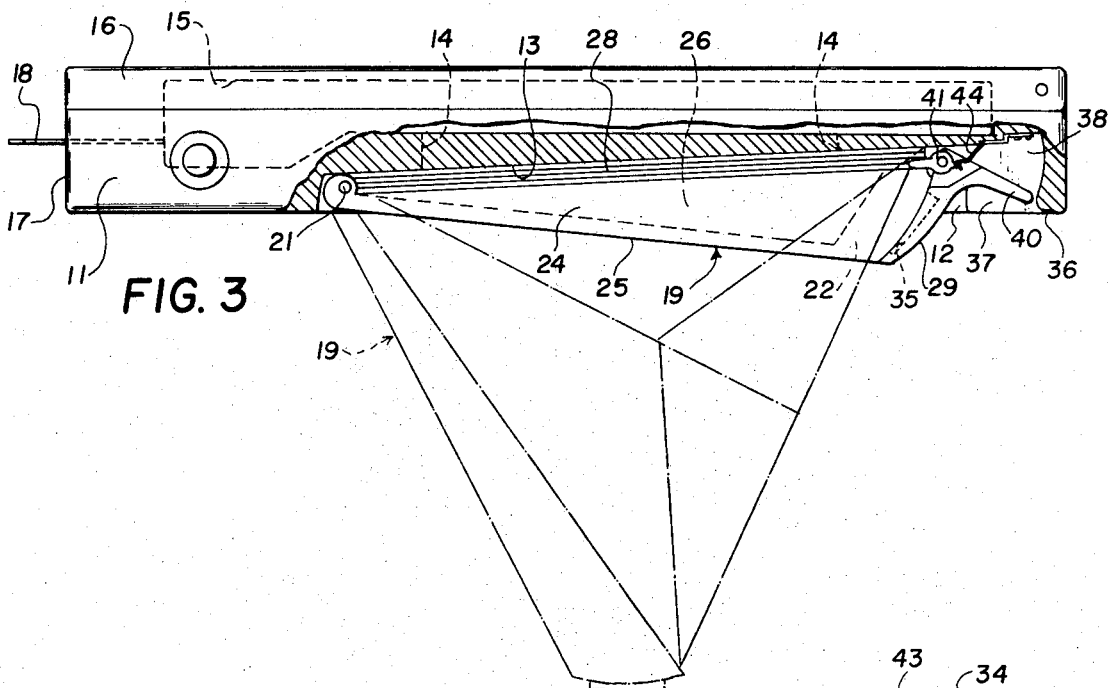
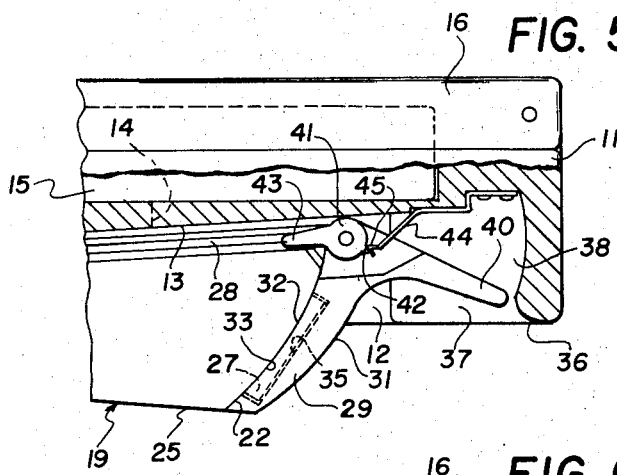
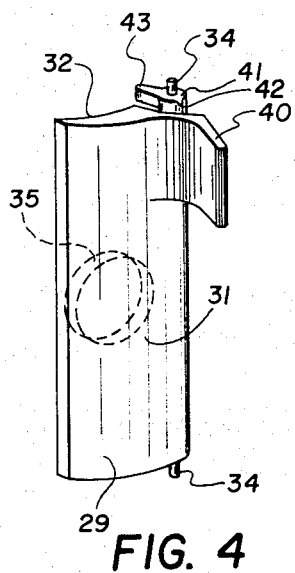
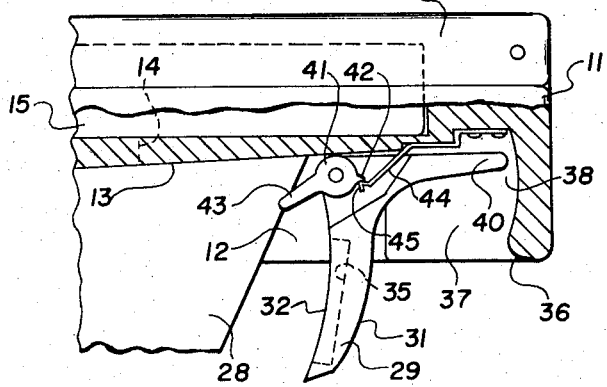
DONALD M. HARVEY
INVENTOR.

COMPACT FOLDING CAMERA

BACKGROUND OF THE INVENTION

1. Field of the Invention

The present invention relates to photography and more particularly to folding cameras of the self-processing type.

2. Description of the Prior Art

In recent years, self-processing cameras have become very popular among amateur photographers. For reasons well known to those skilled in the photographic art, such cameras necessarily require large format film and dictate the use of relatively long focal length objective lenses in order to provide reasonably large finished prints. Accordingly, self-processing cameras are often of the folding type which was common among conventional cameras at the time when the format of most amateur camera film was correspondingly large. The lens and shutter assembly of most folding cameras is carried by a door or lens board that is connected to the camera housing by a collapsible bellows and supported by a parallelogram linkage that maintains the lens in parallel relation to the housing. Alternatively, it is also known to support the lens at one end of a door that is hinged to the housing at its opposite end and provided with a collapsible bellows that allows the door to move between an open position in oblique relation to the housing and a closed position at which the front door surface is substantially flush with the camera housing, thereby giving the closed camera the general shape of a rectangular box. In the latter type of camera, the end of the door opposite the hinge must be relatively thick to accommodate the lens and its shutter. Therefore, in a self-processing camera adapted to be loaded with a film pack, the minimum forward to rearward size of the camera housing is limited by the combination of the thickness of that end of the lens support door and the thickness of the film pack.

SUMMARY OF THE INVENTION

In accordance with the present invention, the bulkiness of a camera of the general type just described is reduced by allowing the lens supporting end of the movable lens support door to extend forwardly beyond the box-like camera housing when that door is in its closed position. In other words, the generally flat front surface of the closed door does not lie flush with or parallel to the front wall of the camera housing but slopes forwardly from the housing toward the end of the door provided with the camera lens. Because that end of the closed door is only partially received within the housing, the latter can be made significantly thinner and correspondingly lighter than is possible in the case of the related type of prior art camera described above. A novel supplemental door cooperates with the lens support door to releasably retain the latter in its closed position and to protect the camera lens, which otherwise would be accessible to dirt or accidental damage. Additionally, the design of the supplemental door structure provides the corresponding end of the camera housing with a handle or hand grip by which the camera can be held conveniently while successive self-processing film units are withdrawn from its opposite end.

Various means for practicing the invention and other advantages and novel features thereof will be apparent from the following detailed description of the preferred embodiment of he invention, reference being made to the accompanying drawings in which like reference numerals denote like elements.

BRIEF DESCRIPTION OF THE DRAWINGS

In the drawings:

FIG. 1 is a perspective view of a self-processing film pack camera according to an illustrative preferred embodiment of the present invention, depicted in its closed condition;

FIG. 2 corresponds to FIG. 1 but shows the camera in its open condition;

FIG. 3 is a plan view of the illustrative camera in its closed condition, partially broken away to show interior camera details;

FIG. 4 is a perspective view of the supplemental door incorporated in the illustrative camera;

FIG. 5 is an enlarged fragmentary cross-sectional view taken along line 5 — 5 of FIG. 1 to illustrate the supplemental door in its operative or latched position in which it releasably latches the lens support door in its closed position and simultaneously protects the camera lens; and FIG. 6 corresponds to FIG. 5 but shows the supplemental door in its unlatched or inoperative position.

DESCRIPTION OF THE PREFERRED EMBODIMENT

Because certain parts of photographic and related apparatus are well known, the following description is directed in particular to those elements forming, or cooperating directly with, the present invention, elements that are not specifically shown or described herein being understood to be selectable from those known in the art.

The camera shown in the accompanying drawings as an illustrative preferred embodiment of the invention comprises a box-like housing 11 having a forwardly facing rectangular recess 12. As shown in FIG. 3, the forwardly sloping rearward wall 13 of recess 12 includes an exposure window 14 aligned with a sheet of film carried by a self-processing film pack 15. The film pack itself can be of a type well known in the photographic art and need not be described in detail for purposes of understanding the present invention. It should be noted, however, that appropriate light sealing means, not shown, are provided between the film pack and exposure window 14 to prevent light from reaching the film within the film pack except through that window. The camera housing is provided with a hinged back wall member 16 that can be opened to allow installation and removal of the film pack. The housing end wall 17 includes a slot, not shown, through which successive exposed film units are withdrawn from the camera by means of corresponding leader strips, one of which is shown at numeral 18.

Lens support door 19 is pivotally mounted to the camera housing by a hinge pin 21 located within recess 12 at one end thereof. The opposite end of the lens support door comprises an end wall 22 which supports the camera lens 23 and its shutter, not shown. Tapered side walls 24 join the lens support wall to the generally flat forward wall 25 of the lens support door and provide the door with an internal rearwardly facing cavity 26. The lens itself is carried by a tubular sleeve 27 which projects somewhat beyond door wall 22 and which can be adapted to rotate for purposes of adjusting the focus of the lens.

The lens support door is connected to the camera housing by a light-tight bellows 28 which is collapsible to allow the door to move between its closed position shown in FIGS. 1 and 3 and its open position shown in FIG. 2. The forwardly facing edge of the collapsible bellows is cemented or otherwise attached to the rearward face of the lens support door surrounding cavity 26 and the rearwardly directed face of the bellows is similarly connected to the camera wall 13 around the edges of exposure window 14. Accordingly, the bellows prevents light from reaching the film in the film pack except through the camera lens. A folding door positioning strut, not shown, is located within the bellows and connects the housing to the lens support door to bias the latter forwardly and to establish its open position at which the lens is in predetermined image focusing relation to the forwardmost film sheet in the film pack. Further details of the bellows and door positioning strut are irrelevant to understanding the present invention but are disclosed, for example, in commonly assigned, copending U.S. Pat. Application Ser. No. 111,468 entitled FOLDING CAMERA and filed in my name on even date herewith.

A supplemental door 29 is adapted to latch the lens support door in its closed position while at the same time providing a protective cover for the camera lens. As best illustrated in FIG. 4, supplemental door 29 has a slightly convex obverse face 31 and a slightly concave reverse face 32 that matches the convex curvature of the external surface 33 of wall 22 of the lens support door. The supplemental door is partially received in housing recess 12 adjacent surface 33 of the closed lens support door and is pivotally mounted to the camera housing by a pivot pin 34 for movement between an operative or latching position shown in FIGS. 1, 3 and 5 and an inoperative or unlatched position shown in FIGS. 2 and 6. When the lens support door is closed and the supplemental door is in its operative position, the adjacent door surfaces 32 and 33 are in matching engagement with each other and the external lens sleeve 27 is received in a mating cylindrical latching recess 35 in the supplemental door. Accordingly, it will be apparent that the supplemental door temporarily latches the lens support door in its closed position and simultaneously protects the lens from dirt or accidental damage. Furthermore, the supplemental door contributes to the smooth external configuration of the closed camera, which is not only aesthetically pleasing but also greatly facilitates sliding the camera into a pocket or carrying case.

Beyond the supplemental door, the end of recess 12 is defined by housing end wall 36, which includes a divider member 37 that separates that end of the recess into two chambers 38 and 39. An operating tongue 40 integral with the supplemental door extends into the relatively narrow recess chamber 38 and is located in spaced relation to housing wall 13 when the supplemental door is in its operative position. By pressing the operating tongue rearwardly the photographer can pivot the supplemental door to its inoperative position shown in FIGS. 2 and 6, thereby releasing the lens support door so that it can move to its open position. Because of the relatively narrow width of chamber 38, the photographer must use the tip of a thumb or finger to press tongue 40 which reduces the possibility of unintentionally releasing the latched lens support door. Chamber 39, however, is wide enough to receive the tips of several fingers at the same time, thus allowing the corresponding portion of housing wall 36 to provide a convenient handle or hand grip member by which the camera can be carried or held while a film unit is withdrawn from its opposite end.

Adjacent operating tongue 40, the supplemental door is provided with a cylindrical boss 41 including a detent lobe or projection 42 and a finger 43 adapted to engage the rearward face of door 19 adjacent bellows 28. A leaf spring 44 is supported to the camera housing within recess chamber 38 and includes a nose portion 45 that engages the rearward face of projection 42 to resiliently maintain the supplemental door in its operative position. When the photographer manually presses operating tongue 40 rearwardly with sufficient force to overcome the detent action of spring 44, the detent lobe or projection moves past the nose portion of spring 44 so that the latter then resiliently maintains the supplemental door in its inoperative position as best shown in FIG. 6. If the lens support door should tend to stick in its closed position after being unlatched, finger 43 moves it slightly forwardly to assist the internal support strut in overcoming that initial resistance. As the lens support door is again closed, the rearward edge surface of that door aligned with finger 43 engages the latter and pivots the supplemental door sufficiently to cause the lobe of cylindrical boss 41 to move to a position at which the nose portion of spring 44 again biases door 29 toward door 19. When the lens support door is fully closed, the supplemental door is therefore again in its operative or latching position and finger 43 is spaced somewhat beyond door 19 so that it cannot urge that door forwardly during the subsequent latch releasing operation until latching recess 35 in the supplemental door has disengaged the lens support sleeve.

Instead of employing the detent mechanism described above, the supplemental door could simply be biased toward its operative position and cooperating ramp or cam means could be provided whereby closing movement of the lens support door would temporarily cam the supplemental door toward its inoperative position to allow engagement of the cooperating latch elements. Also, it should be recognized that although the invention is particularly appropriate for use in self-processing cameras employing film packs or film magazines, various features of the invention could be readily adapted to other types of cameras, e.g., conventional or self-processing cameras loaded with roll film.

The invention has been described in detail with particular reference to the preferred embodiment thereof, but it will be understood that variations and modifications can be effected within the spirit and scope of the invention.

I claim:

1. A combined lens cover and latch for a photographic camera, the camera including a body portion, a lens, and a door mounted on the body portion for supporting and pivoting the lens between open and closed positions, said cover and latch comprising:
- a first element movable from a first position to a second position to engage the door and effect pivoting of the lens from its closed position to its open position, said first element being returned from its second position to its first position in response to movement of the lens to its closed position;
- a second element coupled to and movable with said first element to cover the lens when said first element is in its first position and the lens is in its closed position, said second element latching the lens in its closed position when covering the lens; and
- a third element coupled to said first and second elements to move said first element from its first position to its second position.

2. A folding camera comprising:
a. a generally rectangular boxlike housing having a generally flat front wall surface surrounding a forwardly facing recess in said housing, said recess including an end portion;
b. a lens;
c. a lens support door having a generally flat front face and including an end wall member supporting said lens;
d. hinge means pivotally connecting the end of said lens support door opposite said end wall member to said housing for movement between
   1. an open position in which said lens support door is in oblique relation to said housing to locate said lens at a predetermined operative location relative to said housing and
   2. a closed position in which said flat front face of said lens support door is located in acute angular relation to said front wall surface of said housing with said end wall member of said lens support door being partially received in said recess but extending forwardly beyond said front wall surface and with said end portion of said recess extending beyond said end wall member of said lens support door;
e. a collapsible bellows connecting said lens support door with said housing;
f. a supplemental door partially received within said end portion of said recess, said supplemental door being pivotally supported for movement between
   1. an operative position in which said supplemental door is in confronting engagement with said end wall member of said lens support door and covers said lens supported thereby when said lens support door is in said closed position and
   2. an inoperative position in which said supplemental door is located beyond the path of movement of said end wall member of said lens support door,
   said end wall member of said lens support door and said supplemental door including cooperating latch means adapted to retain said lens support door in said closed position as long as said supplemental door is in said operative position;
g. spring means for resiliently retaining said supplemental door in said operative position;
h. an operating member located on said supplemental door at an accessible position within said end portion of said recess and adapted to be moved rearwardly by finger pressure to move said supplemental door from said operative position to said inoperative position; and
i. a separating wall dividing said end portion of said recess into a relatively small chamber accommodating said operating member of said supplemental door and a substantially larger chamber that provides a gripping structure by which the corresponding end of said camera can be conveniently grasped.

* * * * *